Figure 1:
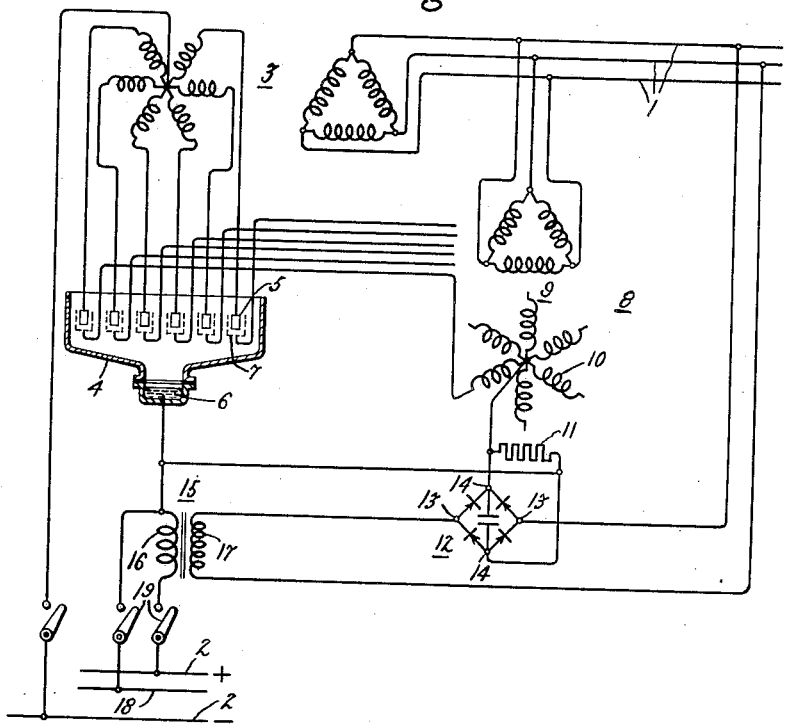

Nov. 12, 1940.   J. C. READ   2,221,524
ELECTRIC VALVE CIRCUIT
Filed Dec. 5, 1938   2 Sheets-Sheet 1

Inventor:
John C. Read,
by Harry E. Dunham
His Attorney.

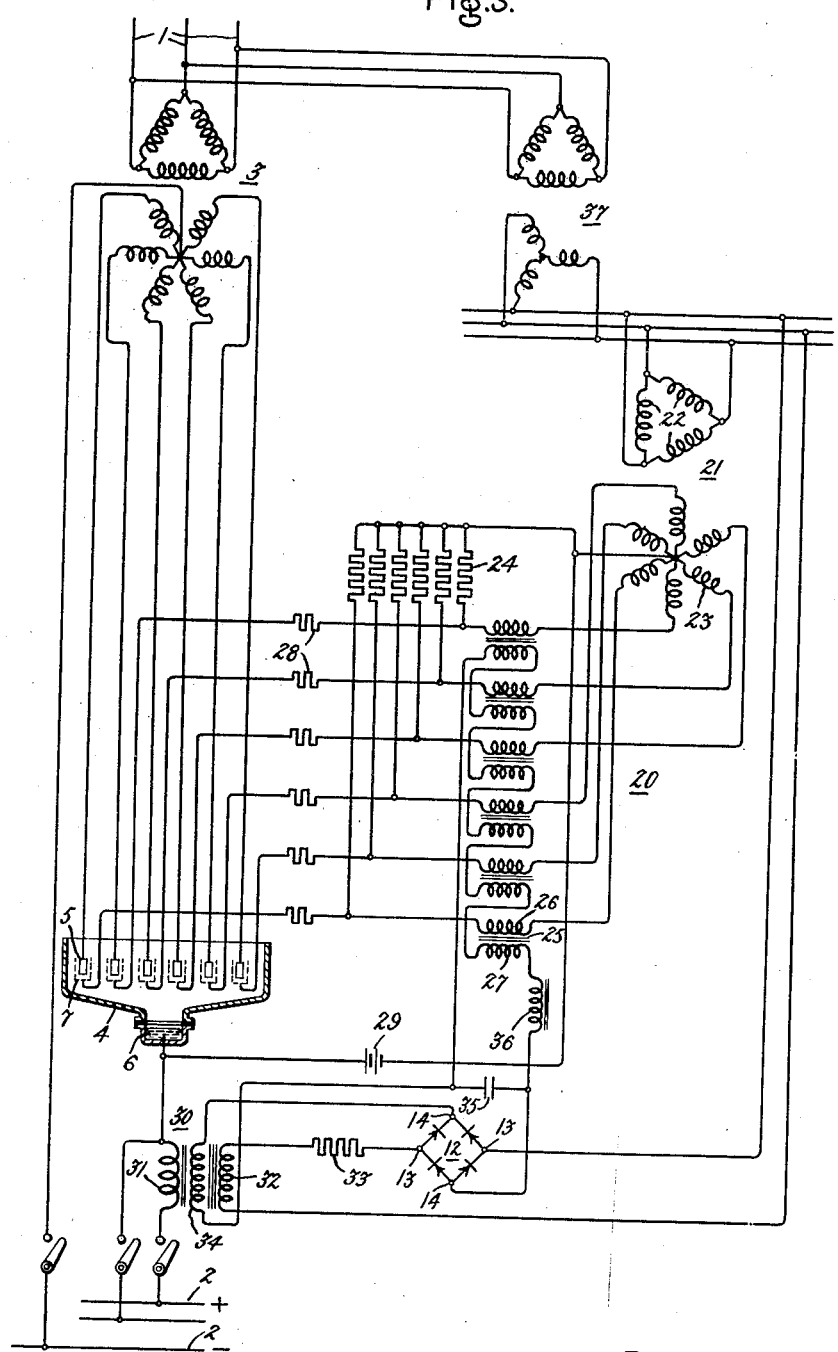

Patented Nov. 12, 1940

2,221,524

UNITED STATES PATENT OFFICE 2,221,524

ELECTRIC VALVE CIRCUIT

John C. Read, Rugby, England, assignor to General Electric Company, a corporation of New York Application December 5, 1938, Serial No. 244,087
In Great Britain December 6, 1937

6 Claims.  (Cl. 175—363)

My invention relates to electric valve circuits and more particularly to control circuits for electric valve translating apparatus.

In many applications where electric valve translating apparatus is employed, it is desirable to maintain an output characteristic, such as the voltage of an associated circuit, at a substantially constant value throughout a predetermined range of power transfer, and to effect a predetermined departure such as a drooping voltage characteristic of the associated circuit when the power transfer tends to exceed a predetermined value. In accordance with the teachings of my invention described hereinafter, I provide new and improved control circuits which accomplish this type of control by employing apparatus entirely electrical in nature and operation and which is susceptible of precise and rapid operation to maintain the desired characteristic under varying load conditions.

It is an object of my invention to provide new and improved electric valve circuits.

It is another object of my invention to provide new and improved control circuits for electric valve translating apparatus.

In accordance with the illustrated embodiments of my invention, I provide new and improved control circuits for electric valve translating apparatus which control an operating condition or an output characteristic of electric valve apparatus, such as the output voltage of an electric valve rectifier. The electric valve rectifier is energized from an alternating current supply circuit and the conductivity of the electric valve means is controlled to maintain the direct current output voltage substantially constant within a predetermined range of power transfer and effects a drooping characteristic of the output voltage when the power transfer tends to exceed a predetermined value. More specifically, the system includes an excitation circuit which impresses on the control members of the electric valve means a variable potential to control the conductivity of the electric valve means.

In one embodiment of my invention, the excitation circuit for the electric valve means includes an impedance element, such as a resistance, which is variably energized by unidirectional current to produce a variable unidirectional biasing potential. A rectifier is connected to be energized from the supply circuit and energizes the impedance element. A variable impedance device, such as a saturable inductive reactance energized in accordance with the current transmitted by the electric valve means, controls the voltage impressed across the input terminals of the rectifier and thereby controls the conductivity of the electric valve means.

In another embodiment of my invention, the excitation circuit comprises a phase shifting arrangement of the static impedance type including a saturable reactance which controls the phase of the control voltage impressed on the control members of the electric valve means. A variable impedance means such as a saturable inductive reactance is connected in series relation with the electric valve means and controls the voltage impressed upon the rectifier which in turn controls the amount of current transmitted to the inductive device in the excitation circuit.

Figure 2:
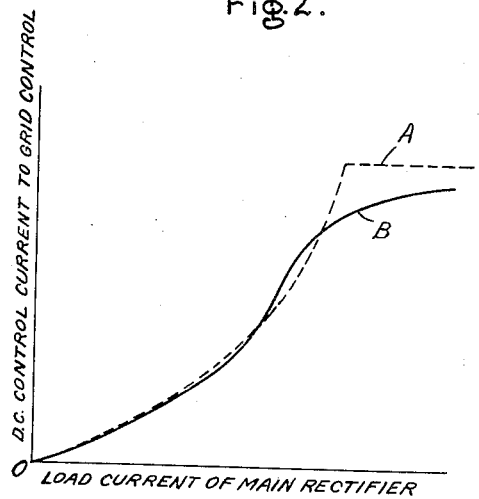

For a better understanding of my invention, reference may be had to the following description taken in connection with the accompanying drawings, and its scope will be pointed out in the appended claims. Fig. 1 diagrammatically represents an embodiment of my invention as applied to an electric valve translating circuit for transmitting power between an alternating current circuit and a direct current circuit, and Fig. 2 represents certain operating characteristics thereof. Fig. 3 diagrammatically illustrates another embodiment of my invention in which an impedance type phase shifting circuit is employed in connection with an electric valve translating system.

Fig. 1 diagrammatically illustrates an embodiment of my invention as applied to an electric valve translating system for transmitting power from an alternating current supply circuit 1 to a direct current load circuit 2 through electric translating apparatus comprising a transformer 3 and an electric valve means 4. The electric valve means 4 may be of the type comprising a plurality of electric discharge paths within a single closing receptacle and having a plurality of anodes 5, a cathode 6 and a plurality of control members 7.

To obtain a desired compounding of an output characteristic of the electric translating apparatus, such as a compounding to maintain substantially constant voltage throughout a predetermined range of power transfer and to effect a predetermined departure from the constant voltage output characteristic, as for example, a drooping voltage characteristic for increases of power beyond the range, I provide a control system comprising an excitation circuit 8. The excitation circuit 8 may comprise a transformer 9 having a plurality of electrically displaced secondary windings 10 and a suitable impedance element, such as a resistance 11 which is connected in circuit with the secondary windings 10 and the control members 7 of the electric valve means 4. The resistance 11 is variably energized by unidirectional current to impress a variable unidirectional potential on the control members 7 to control the conductivities of the associated discharge paths to obtain the desired output characteristic and compounding of the electric valve means 4.

As a means for variably energizing the resistance 11, that is, as a means for transmitting thereto variable amounts of unidirectional current, I provide a rectifier 12 having input terminals 13 and output terminals 14. The output terminals 14 are connected to the terminals of the resistance 11 and the input terminals are connected in series relation with a variable impedance means or device 15 and a suitable phase of the alternating current circuit 1. The variable impedance means 15 may be a saturable inductive device the impedance of which varies in accordance with the current transmitted by the electric valve means 4 and may include a winding 16 connected in series relation with the electric valve means 4, and may include a control winding 17 the impedance of which varies and hence controls the voltage impressed across the input terminals 13 of the rectifier 12. Because the means 15 is of the saturable type, its impedance-current characteristic is nonlinear. Where it is desired to obtain a predetermined number of electric valve means in parallel, equalizing means such as a circuit 18 and switches 19 may be employed.

The operation of the embodiment of my invention shown in Fig. 1 will be explained by considering the system when it is operating to transmit power to the direct current circuit 2 from the alternating current circuit 1. As is well understood by those skilled in the art, the magnitude of the voltage transmitted to the circuit 2 may be controlled by controlling the relative phase displacement of the anode-cathode voltages and the control member voltages of the electric valve means 4. That is, the average voltage impressed on the direct current circuit 2 decreases as the voltages impressed on the control members 7 are retarded in phase from a position of phase coincidence to a lagging position.

The system is adjusted so that as the load transmitted by the translating apparatus increases, the unidirectional voltage produced by the rectifier 12 increases to maintain the voltage of the direct current circuit 2 substantially constant until a predetermined load is attained, at which value the unidirectional voltage does not change substantially and the output voltage of the translating system drops upon further increases of load. More specifically, within a predetermined range of power transfer, the saturable inductive device 15 is substantially unsaturated so that the impedance of the winding 17 is relatively large but varies in response to the amount of load transmitted. Within this range of power transfer for changes of load the impedance of the winding 17 decreases to effect a predetermined increase of the voltage impressed across the input terminals 13 of the rectifier 12. As a result, the rectifier 12 transmits larger amounts of unidirectional current to the resistance 11 and the voltage impressed on the control members 7 is advanced in phase relative to the associated anode to tend to maintain the voltage of circuit 2 constant. However, when the load attains a predetermined value, the saturable inductive device 15 becomes saturated and the impedance of the windings 17 remains substantially constant upon further increase of load. As a result thereof, the voltage impressed across the terminals of the rectifier 12 remains constant and the unidirectional voltage produced by resistance 11 is substantially constant. In this manner, there is effected a predetermined drooping characteristic of the electric valve means 4 when the load tends to exceed a predetermined value.

This operating characteristic may be more fully explained by referring to Fig. 2 in which curve A represents the desired relationship between load current and the unidirectional current which should be transmitted to resistance 11 to obtain the desired compounding. Curve B represents the actual relation between load current and the current transmitted to resistance 11 in systems employing the embodiment of my invention diagrammatically illustrated in Fig. 1. It will be noted that within a predetermined range of load current, the current transmitted to resistance 11 increases to maintain the voltage of circuit 2 substantially constant. When the predetermined range of power transfer is exceeded, due to the saturation of device 15 the current transmitted to resistance 11 remains substantially constant or increases at a rate substantially less than that during the predetermined range of power transfer for which the system is adjusted.

In Fig. 3 there is diagrammatically illustrated another embodiment of my invention which is similar in many respects to that described above in connection with Fig. 1, and corresponding elements have been assigned like reference numerals. I provide an excitation circuit 20 for energizing the control members 7 by impressing thereon alternating voltages of variable phase displacement with respect to the associated anode-cathode voltages and which comprises a transformer 21 having primary windings 22 and secondary windings 23. I also provide a plurality of static impedance type phase shifting circuits, each of which may comprise a resistance 24 and a saturable inductive reactance 25 each having a variable impedance winding 26 and a control winding 27. Current limiting resistances 28 are connected in series relation with the control members 7. A suitable source of unidirectional biasing potential such as a battery 29 may be connected in series relation with the secondary windings 23, windings 26 of reactances 25, current limiting resistances 28 and control members 7.

As a means for impressing upon the rectifier 12 a voltage which varies in accordance with the load transmitted by electric valve means 4 to obtain a desired compounding of an output characteristic of the system, I provide a suitable variable impedance means such as a saturable inductive device 30 which may have a winding 31 connected in series relation with the electric valve means 4, a variable impedance winding 32 which is connected in series relation with the input terminals 13 of the rectifier 12 through a current control or limiting resistance 33, and an additional control winding 34 which is connected to be energized in response to the current conducted by the rectifier 12 and is also connected in circuit with the various control windings 27 of the inductive reactances 25 of excitation circuit 20. Suitable filtering means, such as a circuit comprising a capacitance 35 and an inductance 36, may be connected between the rectifier 12 and the inductive reactances 25 so that the current transmitted to the windings 27 does not contain undesirable harmonics. A suitable phase shifting means such as a rotary phase shifter 37 may be connected between the excitation circuit 20 and the alternating current circuit 1 to adjust the phase of the alternating voltage supplied to the excitation circuit.

The embodiment of my invention shown in Fig. 3 operates in substantially the same manner as that explained above in connection with the arrangement of Fig. 1. The static impedance phase shifting circuits of the excitation circuit 20 impress upon the control members 7 alternating voltages of variable phase displacement with respect to the associated anode-cathode voltages. That is, as the inductive reactances 25 become saturated, the voltages impressed on the control members 7 are advanced in phase with respect to the associated anode-cathode voltages. Conversely, as the reactances 25 are desaturated, the voltages impressed on the control members 7 are retarded in phase with respect to the anode-cathode voltages. Accordingly, the output voltage of the electric valve means 4 is increased or decreased, depending upon the direction of change in the phase displacement between the anode-cathode voltages and the control member voltages.

The voltage impressed on the input terminals 13 of the rectifier 12 varies in accordance with the impedance of the winding 32 of the variable impedance device 30. Furthermore, the impedance of the winding 32 is controlled by the magnetization of the core member of the variable impedance device 30 and this, in turn, is controlled by the amount of current transmitted by windings 31 and 34. Since winding 31 is controlled in accordance with the load current, the device 30 gradually becomes saturated as the load increases, tending to decrease the impedance of the winding 32 and effecting an increase in the voltage impressed upon rectifier 12. As a result, the current transmitted to windings 27 of reactances 25 is increased and the voltages impressed on the control members 7 are advanced in phase. Inasmuch as the winding 34 is energized in accordance with the current transmitted by rectifier 12 and since winding 34 is connected accumulatively relative to winding 31, winding 34 assists winding 31 to effect saturation of the device 30, making possible a greater degree of precision in the control of the output characteristic of the control apparatus. When the device 30 becomes substantially fully saturated, there is established a limit to the phase advancement of the control member voltages, whereby effecting a drooping voltage characteristic upon further increase of load.

It will be understood that the voltages impressed upon the control members 7 are retarded in phase as the load transmitted decreases from a relatively large value to a smaller value, so that the voltage of the direct current circuit 2 is maintained substantially constant.

The embodiment of my invention shown in Fig. 3 may be arranged to obtain a compounded output characteristic such as that explained above in connection with the arrangement of Fig. 1. That is, the system of Fig. 3 may be arranged to maintain the voltage of circuit 2 substantially constant within a predetermined range of power transfer but to effect a drooping output voltage characteristic in the event the load tends to exceed a predetermined value.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an alternating current circuit, a direct current circuit, electric translating apparatus connected between said circuits and comprising electric valve means having an anode, a cathode and a control member for controlling the conductivity thereof, an excitation circuit for impressing on said control member a variable voltage and comprising an impedance element, a saturable inductive reactance having a non-linear impedance-current characteristic and including a winding energized in accordance with the current conducted by said electric valve means and having a control winding, and a rectifier having input terminals connected in series relation with said control winding and connected to be energized from said alternating current circuit through said control winding and having output terminals connected to said impedance element to supply to said impedance element an increasing current within a predetermined range of current transfer by said electric valve means and to supply a substantially constant current to said impedance element when the current conducted by said electric valve means tends to exceed said range.

2. In combination, an alternating current circuit, a direct current circuit, electric translating apparatus connected between said circuits and comprising electric valve means of the type having a control member for controlling the conductivity thereof, an excitation circuit for impressing on said control member a variable unidirectional potential and comprising an impedance element, and means for energizing said impedance element to maintain an output characteristic of said electric valve means substantially constant within a predetermined range of power transfer and for effecting a predetermined departure from said characteristic when the power transfer tends to exceed a predetermined value and comprising a saturable inductive reactance having a non-linear impedance-current characteristic and including a winding connected to be energized in accordance with the current conducted by said electric valve means and having a control winding and a rectifier having an input circuit connected in series relation with said control winding and connected to be energized from said supply circuit and having an output circuit connected to said impedance element to supply variable amounts of unidirectional current thereto.

3. In combination, an alternating current supply circuit, a direct current load circuit, electric translating apparatus connected between said circuits and comprising electric valve means of the type employing a control member for controlling the conductivity thereof, an excitation circuit for impressing on said control member a variable potential and comprising an impedance element, a rectifier energized from said alternating current circuit for supplying variable amounts of unidirectional current to said impedance element, and means for controlling the current supplied to said impedance element and comprising a saturable inductive reactance having a nonlinear impedance-current characteristic and comprising a winding energized in accordance with the current transmitted by said electric valve means and having a control winding connected in series relation with said rectifier to impress on said rectifier an increasing voltage for a predetermined range of current transfer by said electric valve means and to impress thereon a substantially constant voltage when the current transfer tends to exceed said range.

4. In combination, an alternating current supply circuit, a direct current load circuit, electric valve means connected between said circuits and comprising a control member for controlling the conductivity thereof, an excitation circuit comprising an impedance element for impressing on said control member a variable unidirectional potential, and means for supplying to said impedance element variable amounts of unidirectional current to maintain the voltage of said load circuit at a substantially constant value within a predetermined range of power transfer and for effecting a predetermined decrease in the voltage of said direct current circuit when the power transfer tends to exceed said range and comprising a rectifier energized from said supply circuit and a saturable inductive device having a nonlinear impedance-current characteristic and being energized in accordance with the current transmitted by said electric valve means for controlling the voltage impressed on said rectifier.

5. In combination, an alternating current circuit, a direct current circuit, electric translating apparatus connected between said circuits and comprising electric valve means having a control member for controlling the conductivity thereof, an excitation circuit for impressing on said control member a periodic voltage of variable phase displacement and comprising a phase shifting circuit including a variable inductive reactance, a rectifier energized from said alternating current circuit for transmitting variable amounts of unidirectional current to said inductive reactance, and a saturable inductive reactance having a nonlinear impedance-current characteristic and comprising a winding connected to be energized in accordance with the current transmitted by said electric valve means and having a control winding inductively associated with said first mentioned winding for controlling the voltage impressed on said rectifier to maintain the voltage of said direct current circuit at a substantially constant value during a predetermined range of power transfer and to decrease the voltage applied to said direct current circuit at a predetermined rate when the power transfer tends to exceed said range.

6. In combination, an alternating current circuit, a direct current circuit, electric translating apparatus connected between said circuits and comprising electric valve means having a control member for controlling the conductivity thereof, an excitation circuit for impressing on said control member a periodic voltage of variable phase displacement and comprising a phase shifting circuit including a variable inductive reactance, a rectifier energized from said alternating current circuit for transmitting variable amounts of unidirectional current to said inductive reactance, and a saturable inductive reactance having a winding connected in series relation with said electric valve means and having a pair of control windings, one of said control windings being connected in series relation with said rectifier to control the voltage impressed thereacross and the other of said control windings being energized in accordance with the current conducted by said rectifier to control the magnetization of said last mentioned reactance.

JOHN C. READ.